US009662858B1

(12) United States Patent
Kuramoto et al.

(10) Patent No.: US 9,662,858 B1
(45) Date of Patent: May 30, 2017

(54) MOLDING PACKAGING MATERIAL AND BATTERY CASE

(71) Applicant: Showa Denko Packaging Co., Ltd., Isehara-shi, Kanagawa (JP)

(72) Inventors: Tetsunobu Kuramoto, Isehara (JP); Yuji Minamibori, Isehara (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 0 days.

(21) Appl. No.: 15/448,654

(22) Filed: Mar. 3, 2017

Related U.S. Application Data

(62) Division of application No. 14/007,653, filed as application No. PCT/JP2012/058429 on Mar. 29, 2012.

(30) Foreign Application Priority Data

Mar. 29, 2011 (JP) ................................ 2011-072538

(51) Int. Cl.
*B32B 7/02* (2006.01)
*H01M 2/02* (2006.01)

(52) U.S. Cl.
CPC ............ *B32B 7/02* (2013.01); *H01M 2/0277* (2013.01); *H01M 2/0287* (2013.01); *H01M 2002/0297* (2013.01)

(58) Field of Classification Search
CPC ............ H01M 2/0277; H01M 2/0287; H01M 2/2002; H01M 2/0297
See application file for complete search history.

(56) References Cited

PUBLICATIONS

Kuramoto et al., "Molding Packaging Material and Battery Case", U.S. Appl. No. 14/007,653, filed Nov. 27, 2013.

*Primary Examiner* — Jane Rhee
(74) *Attorney, Agent, or Firm* — Keating and Bennett, LLP

(57) ABSTRACT

Provided is a molding packaging material that can have an increased use life, can suppress a decrease over time in inter-layer lamination strength, and has superior molding properties in extrusion molding, draw forming, and the like. The laminate molding packaging material contains: an outside substrate layer (2) comprising a heat-resistant resin; an inside sealant layer (3) comprising a thermoplastic resin; and a metal foil provided between the two layers as a barrier layer (4). In the heat-resistant resin of the outside substrate layer (2), a biaxially oriented polyethyleneterephthalate film is used that, when the tensile breaking strength in the M direction is MB and the tensile breaking strength in the T direction is TB, the following are satisfied: formula (I) 500 MPa=MB+TB=700 MPa; and formula (II) |MB−TB|=30 MPa.

5 Claims, 1 Drawing Sheet

MOLDING PACKAGING MATERIAL AND BATTERY CASE

TECHNICAL FIELD

The present invention relates to a laminate molding packaging material which is molded into a tray shape by draw forming or bulging to be used. More specifically, the present invention relates to a laminate packaging material which is suitably used as a case material of secondary batteries, such as lithium ion batteries for notebook personal computers, cellular phones, and on-vehicle and fixed type power sources, and further is suitably used also as a packaging material for foods, pharmaceuticals, and the like.

TECHNICAL BACKGROUND

Heretofore, as packaging materials for foods, such as retort foods, pharmaceuticals, or industrial chemicals, a laminate packaging material which contains a metallic foil excellent in barrier properties of oxygen or moisture and in which the metallic foil is laminated between a substrate film and a sealant layer in order to prevent the chemical change, degradation, decomposition, and the like of contents has been widely used (Patent Document 1).

On the other hand, in recent years, in connection with a reduction in the size and the weight of various electronic devices, such as OA devices (e.g., personal computers), cellular phones, game machines, headphone stereos, and electronic notebooks, a lithium ion polymer secondary batteries has been increasingly used from the viewpoint of achieving a reduction in the size and the weight also as a battery of a power source portion in many cases. In the lithium ion polymer secondary battery, when an electrolytic solution in the battery reacts with water and then hydrofluoric acid is generated, a reduction in the performance of the battery is caused or liquid leakage occurs by corrosion of the case. Therefore, the same laminate packaging material as above having excellent water vapor barrier properties and high sealing properties has been increasingly used as a material for use in the case (storing case).

More specifically, as the case material of the lithium ion polymer secondary battery (packaging material), a laminate packaging material in which an outer layer containing a heat-resistant resin film of a polyester type, an epoxy type, an acrylic type, or the like, an intermediate layer mainly containing an aluminum foil as a water vapor barrier layer, and an inside sealant layer containing a heat adhesive polyolefin resin for sealing a polymer electrolyte which is the content are laminated in order and integrated has been used (Patent Documents 2 and 3).

The laminate packaging material for battery case described above is molded into a three-dimensional rectangular parallelepiped shape or the like by bulging or deep draw forming in order to increase the capacity as much as possible to charge a polymer electrolyte, and then used as a battery case in many cases.

PRIOR ART DOCUMENTS

Patent Documents

Patent Document 1: Japanese Unexamined Patent Application Publication No. 2004-319414

Patent Document 2: Japanese Unexamined Patent Application Publication No. 2001-202928

Patent Document 3: Japanese Unexamined Patent Application Publication No. 2001-266810

SUMMARY OF INVENTION

Problems to be Solved by the Invention

However, in the above-described known laminate packaging materials, the molding properties when molded into a tray shape are generally poor and there is a possibility such that cracks and pinholes are generated by bulging or draw forming. Therefore, the laminate packaging materials have had a disadvantage in that the laminate packaging materials are difficult to be molded into a desired depth with sufficiently high capacity.

Moreover, in most of the above-described known laminate packaging materials, since the aluminum foil as a barrier layer and the inside sealant layer are bonded using a two component mixed adhesive in which a main agent having a common hydroxyl group and a curing agent having an isocyanate group are mixed, the lamination strength between the aluminum foil and the sealant layer decreases with time due to an electrolytic solution which is the content, and consequently the electrolytic solution which is the content may leak. Therefore, there has been a problem in that a desired increase in life has not been achieved.

The present invention has been made in view of the technical background described above. It is a first object of the invention to provide a molding packaging material whose molding properties are improved and which can achieve molding with sharpness and a high depth without generating cracks and pinholes.

In addition, it is another object of the present invention to provide a molding packaging material in which a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can be prevented, so that the interlayer lamination strength is excellent, to prevent causing poor appearance even when an electrolytic solution adheres to the surface, and further to provide a manufacturing method capable of manufacturing such a molding packaging material with good productivity.

The other purposes and advantages of the present invention are clarified from a description of preferable embodiments described below.

Means for Solving the Problems

In order to achieve the objects, the present invention provides the following measures.

[1] A molding packaging material contains an outside substrate layer containing a heat-resistant resin, an inside sealant layer containing a thermoplastic resin, and a metallic foil as a barrier layer provided between the layers, in which the substrate layer contains a biaxially oriented polyethyleneterephthalate film and the film satisfies the following Expressions (I) and (II), $$500\ \mathrm{MPa} \leq MB+TB \leq 700\ \mathrm{MPa} \qquad \text{Expression (I)}$$

$$|MB-TB| \leq 30\ \mathrm{MPa} \qquad \text{Expression (II)}$$

MB: Tensile breaking strength in the direction M of the biaxially oriented polyethyleneterephthalate film TB: Tensile breaking strength in the direction T of the biaxially oriented polyethyleneterephthalate film.

[2] A molding packaging material containing an outside substrate layer containing a heat-resistant resin, an inside sealant layer containing a thermoplastic resin, and a metallic foil as a barrier layer provided between the layers, in which at least an inside surface of the metallic foil layer is subjected to chemical conversion treatment, an inside adhesion resin layer having adhesiveness to both the metallic foil as the barrier layer and the resin of the inside sealant layer is laminated on the chemical conversion-treated surface, the inside sealant layer is further laminated through the adhesion resin layer, the outside substrate layer contains a biaxially oriented polyethyleneterephthalate film, and the film satisfies the following Expressions (I) and (II), $$500\ \text{MPa} \leq MB+TB \leq 700\ \text{MPa} \qquad \text{Expression (I)}$$

$$|MB-TB| \leq 30\ \text{MPa} \qquad \text{Expression (II)}$$

MB: Tensile breaking strength in the direction M of the biaxially oriented polyethyleneterephthalate film TB: Tensile breaking strength in the direction T of the biaxially oriented polyethyleneterephthalate film.

[3] The molding packaging material described in [2] above, in which the inside adhesion resin layer contains an adhesive containing a polyolefin resin having a carboxyl group and a multifunctional isocyanate compound.

[4] The molding packaging material described in [3] above, in which an equivalent ratio [NCO]/[OH] of an isocyanate group of the multifunctional isocyanate compound to a hydroxyl group constituting the carboxyl group of the polyolefin resin is 1.0 to 10.0.

[5] The molding packaging material described in [3] or [4] above, in which, in the polyolefin resin having a carboxyl group, the melt flow rate (MFR) measured at 130° C. is 5 to 40 g/10 min.

[6] The molding packaging material described in [2] above, in which the inside adhesion resin layer contains an adhesive containing polyolefin polyol and a multifunctional isocyanate curing agent.

[7] The molding packaging material described in [6] above, in which the inside adhesion resin layer further contains a thermoplastic elastomer and/or a tackifier.

[8] The molding packaging material described in any one of [1] to [7] above, in which the inside sealant layer contains a propylene homopolymer or a copolymer containing at least propylene and ethylene as a copolymerization component.

[9] The molding packaging material described in [8] above, in which the inside sealant layer is the polymer or the copolymer having a melting point of 130° C. to 160° C. and an MFR of 1 to 25 g/10 min.

[10] A battery case, which is obtained by performing deep draw forming or bulging of the molding packaging material described in any one of [1] to [9] above.

[11] The molding packaging material described in any one of [1] to [9] above, which is used as a packaging material for foods or pharmaceuticals.

[12] A method for manufacturing a molding packaging material, including a process of subjecting at least one surface of a metallic foil for a barrier layer to chemical conversion treatment, a process of bonding a biaxially oriented polyethyleneterephthalate film to the other surface of the metallic foil with an outside adhesive to form an outside substrate layer, a process of forming an inside adhesion resin layer having adhesiveness to both the metallic foil as the barrier layer and a resin of an inside sealant layer described later on one chemical conversion-treated surface of the metallic foil, a process of laminating and forming the sealant layer containing a thermoplastic resin on the inside adhesion resin layer, and a process of heat treating a laminate obtained by the processes above with a heat roll heated to 130° C. to 220° C. in such a manner that the outside substrate layer is on the side of the heat roll, in which one satisfying the following Expressions (I) and (II) is used as the biaxially oriented polyethyleneterephthalate film, $$500\ \text{MPa} \leq MB+TB \leq 700\ \text{MPa} \qquad \text{Expression (I)}$$

$$|MB-TB| \leq 30\ \text{MPa} \qquad \text{Expression (II)}$$

MB: Tensile breaking strength in the direction M of the biaxially oriented polyethyleneterephthalate film TB: Tensile breaking strength in the direction T of the biaxially oriented polyethyleneterephthalate film.

[13] The method for manufacturing a molding packaging material described in [12] above, in which a resin containing a propylene homopolymer or a copolymer resin containing at least propylene and ethylene as a copolymerization component and having a melting point of 130° C. to 160° C. and an MFR of 1 to 25 g/10 min is used as the thermoplastic resin of the sealant layer.

[14] The method for manufacturing a molding packaging material described in [12] or [13] above, in which the inside adhesion resin layer is formed by applying and drying an adhesion resin containing a polyolefin resin having a carboxyl group and a multifunctional isocyanate compound and having an equivalent ratio [NCO]/[OH] of an isocyanate group of the multifunctional isocyanate compound to a hydroxyl group constituting the carboxyl group of the polyolefin resin of 1.0 to 10.0.

[15] The method for manufacturing a molding packaging material described in [12] or [13] above, in which the inside adhesion resin layer is formed with an adhesive composition containing polyolefin polyol and a multifunctional isocyanate curing agent and further containing a thermoplastic elastomer and/or a tackifier.

Effects of the Invention

According to the invention of [1], due to the fact that the heat-resistant resin as a constituent material of the outside substrate layer contains a biaxially oriented polyethylene terephthalate resin, the molding packaging material is excellent in chemical resistance as compared with a case of using another heat-resistant resin, such as polyamide resin and acrylic resin. For example, when the molding packaging material is used for a battery case, a whitening phenomenon and appearance degradation due to the adhesion of an electrolytic solution do not occur, and the electrolytic solution adhesion appearance holding properties can be made good without a necessity of separately providing a surface protection layer.

In addition, due to the fact that the polyethyleneterephthalate film of the outside substrate layer contains a biaxially oriented polyethyleneterephthalate resin satisfying the following Expressions (I) and (II), $$500\ \text{MPa} \leq MB+TB \leq 700\ \text{MPa} \qquad \text{Expression (I)}$$

$$|MB-TB| \leq 30\ \text{MPa} \qquad \text{Expression (II)}$$

when the tensile breaking strength in the direction M of the biaxially oriented polyethyleneterephthalate film is defined as "MB" and the tensile breaking strength in the direction T of the biaxially oriented polyethyleneterephthalate film is defined as "TB", a molding packaging material which is excellent in molding properties and can achieve molding with sharpness and sufficient depth without generating pinholes and cracks when subjected to molding processing of draw forming, bulging, or the like can be provided.

The "direction M" in the description above is an extrusion film formation direction of the polyethyleneterephthalate film and the "direction T" is a direction perpendicular to the direction M.

According to the invention of [2], the molding packaging material contains the outside substrate layer, the inside sealant layer, and the metallic foil as a barrier layer provided between these layers, in which at least an inside surface of the metallic foil is subjected to chemical conversion treatment and an adhesion resin layer having adhesiveness to both the metallic foil and the resin of the inside sealant layer is laminated on the chemical conversion-treated surface, and therefore the interlayer lamination strength of the sealant layer and the metallic foil can be sufficiently favorably secured. Moreover, since the outside substrate layer is a biaxially oriented polyethyleneterephthalate film, it is a matter of course that the molding packaging material is excellent in molding properties and the appearance is not noticeably impaired even when an electrolytic solution and the like adheres thereto and furthermore, due to the fact that one having a tensile strength balance in a specific range satisfying particularly Expressions (I) and (II) above is used as the polyethyleneterephthalate film, the molding packaging material can be provided in which more excellent molding properties can be achieved and which can be molded into a container with sharpness and a high depth while avoiding the occurrence of molding troubles. Furthermore, since at least one surface of the metallic foil layer is subjected to the chemical conversion treatment, a corrosion of the surface of the metallic foil caused by contents (an electrolytic solution of a battery, foods, pharmaceuticals, and the like) can be sufficiently prevented. When the molding packaging material is used as a battery case, a reduction in the interlayer lamination strength of the barrier layer of the metallic foil and the inside sealant layer caused by an influence of an electrolytic solution can be prevented and a reduction in the interlayer lamination strength caused by an influence of a generation of heat and an expansion and a contraction of the packaging material due to a repetition of charge and discharge can be prevented, so that sufficient sealing performance can be secured.

According to the invention of [3], due to the fact that the inside adhesion resin layer contains an adhesive containing a polyolefin resin having a carboxyl group and a multifunctional isocyanate compound, a reduction with time in the lamination strength between the metallic foil and the inside sealant layer caused by an influence of an electrolytic solution in the use as a battery case can be more effectively reduced and prevented.

According to the invention of [4], due to the fact that the equivalent ratio [NCO]/[OH] of an isocyanate group of the multifunctional isocyanate compound to a hydroxyl group constituting the carboxyl group of the polyolefin resin is 1.0 to 10.0, a packaging material for battery case in which the interlayer adhesion strength hardly decreases over a longer period of time more is provided.

According to the invention of [5], due to the fact that the polyolefin resin having a carboxyl group of the inside adhesion resin layer is one having a melt flow rate (MFR) measured at 130° C. of 5 to 40 g/10 min, a uniform coating formation thereof can be easily and securely performed and a reduction with time in the lamination strength of the barrier layer of the metallic foil and the inside sealant layer can be more effectively reduced and the useful life can be increased.

According to the invention of [6], due to the fact that the inside adhesion resin layer contains an adhesive containing polyolefin polyol and a multifunctional isocyanate curing agent, a degradation with time of the lamination strength between the metallic foil as the barrier layer and the inside sealant layer caused an influence of an electrolytic solution and the like can be effectively suppressed and the water vapor barrier properties can also be favorably maintained.

According to the invention of [7], due to the fact that an adhesive composition in which a thermoplastic elastomer and/or an adhesion imparting agent are/is further added to the adhesive of the invention of [6] above is used, a further improvement of the interlayer lamination strength can be achieved.

According to the invention of [8], since the sealant layer is formed with a propylene homopolymer or a copolymer resin containing at least propylene and ethylene as a copolymerization component, sufficient heat resistance can be secured and excellent sealing performance can be secured.

According to the invention of [9], since the melting point of the polymer or the copolymer of the invention of [8] above is 130 to 160° C. and the MFR thereof is 1 to 25 g/10 min, sufficient heat resistance can be secured and moderate fluidity can be realized in sealing, so that excellent sealing performance can be secured.

According to the invention of [10], a battery case which has high interlayer lamination strength and has a long useful life without molding defects is provided.

According to invention of [11], a food packaging material or a pharmaceutical packaging material having high interlayer lamination strength and excellent molding properties is provided.

According to the invention of [12], the method for manufacturing a molding packaging material includes the process of subjecting at least one surface of a metallic foil for a barrier layer to chemical conversion treatment, the process of bonding a biaxially oriented polyethyleneterephthalate film to the other surface of the metallic foil with an outside adhesive to form an outside substrate layer, the process of forming an inside adhesion resin layer having adhesiveness to both the metallic foil as the barrier layer and a resin of an inside sealant layer described later to the one chemical conversion-treated surface of the metallic foil, the process of laminating and forming the sealant layer containing a thermoplastic resin on the inside adhesion resin layer, and the process of heat treating a laminate obtained by the processes above with a heat roll heated to 130° C. to 220° C. in such a manner that the outside substrate layer is on the side of the heat roll, in which one satisfying Expressions (I) and (II) above is used as the biaxially oriented polyethyleneterephthalate film. Therefore, it is a matter of course that the molding packaging material having various effects described above can be efficiently manufactured, and furthermore the molding packaging material can be obtained which is excellent particularly in the interlayer adhesion strength of the metallic foil and the inside sealant layer, i.e., lamination strength.

Therefore, when the obtained molding packaging material is molded into a battery case, for example, a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can also be prevented and sufficient sealing performance can be secured. Moreover, since at least a surface to which a treatment liquid is applied of the metallic foil as a barrier layer is subjected to the chemical conversion treatment, the molding packaging material can be manufactured in which a corrosion of the surface of the metallic foil caused by contents (an electrolytic solution of a battery, foods, pharmaceuticals, and the like) can be sufficiently prevented.

According to the invention of [13], since a propylene homopolymer or a copolymer resin containing at least propylene and ethylene as a copolymerization component and having a melting point of 130° C. to 160° C. and an MFR of 1 g/10 min to 15 g/10 min is used as the thermoplastic resin of the inside sealant layer, a molding packaging material which has sufficient heat resistance and in which moderate fluidity can be realized in sealing, so that excellent sealing performance can be secured can be manufactured.

According to the invention of [14], since the inside adhesion resin layer is formed by applying and drying an adhesion resin containing a polyolefin resin having a carboxyl group and a multifunctional isocyanate compound and having an equivalent ratio [NCO]/[OH] of an isocyanate group of the multifunctional isocyanate compound to a hydroxyl group constituting the carboxyl group of the polyolefin resin of 1.0 to 10.0, a reduction with time in the adhesion strength between the aluminum foil and the inside sealant layer by the electrolytic solution of the battery is sufficiently suppressed over a long period of time. Therefore, excellent electrolytic solution resistance is imparted and moreover the moisture penetration amount is small, and thus a stable packaging material for battery case with long life can be manufactured.

According to the invention of [15], since the inside adhesion resin layer is formed with an adhesive composition containing polyolefin polyol and a multifunctional isocyanate curing agent and further containing a thermoplastic elastomer and/or a tackifier, a molding packaging material can be provided in which a degradation with time of the lamination strength between the metallic foil as the barrier layer and the inside sealant layer can be effectively suppressed and which is excellent also in water vapor barrier properties.

EMBODIMENTS FOR CARRYING OUT THE INVENTION

Figure 1:
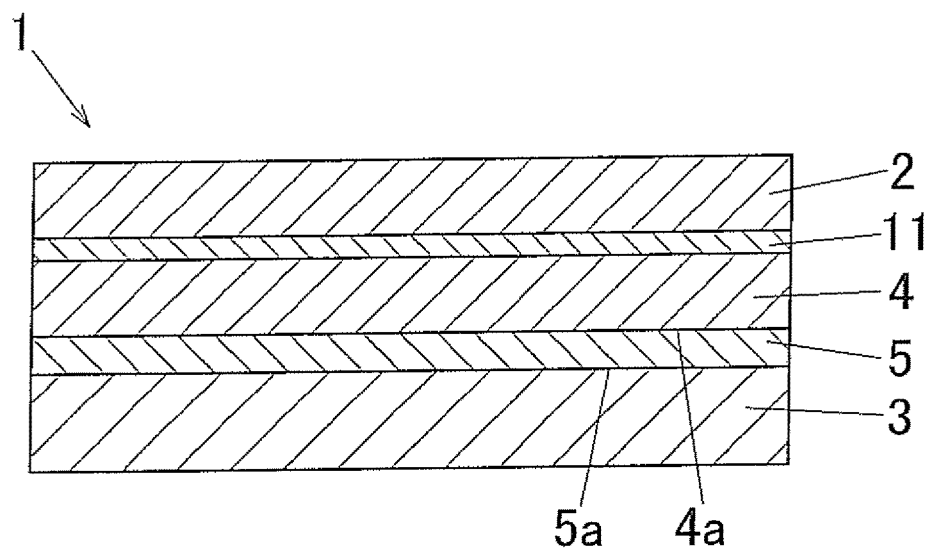
FIG. 1 is a cross sectional view illustrating one embodiment of a molding packaging material according to the present invention.

One preferable embodiment of a molding packaging material 1 according to the invention is illustrated in FIG. 1. The molding packaging material (1) is molded into an approximately rectangular parallelepiped shape whose upper surface is made to open, for example, to be used as a case of a lithium ion polymer secondary battery.

In the molding packaging material (1), an outside substrate layer (2) containing a heat-resistant resin film is laminated and integrated on one surface of a metallic foil (4) as a barrier layer through an adhesive layer (11). An inside sealant layer (3) is laminated and integrated on another surface (4*a*) of the metallic foil (4) through an inside adhesion resin layer (5) having adhesiveness to both the metallic foil (4) and a resin of the inside sealant layer (3).

The outside substrate layer (2) may be one in which a biaxially oriented polyethyleneterephthalate resin layer described later is used for at least the outermost layer and may be one having a single layer configuration thereof or one having a multilayer configuration in which various kinds of heat-resistant resin different in the type and the properties are laminated therein.

Similarly, the inside sealant layer (3) may be one having a heat adhesive resin layer containing polypropylene for at least the innermost layer, and another intermediate resin layer may be interposed between the inside adhesion resin layer (5) and the innermost layer of the inside sealant layer (3). In this case, the intermediate resin layer interposed therebetween is regarded as a part of the sealant layer (3) in the invention. The inside adhesion resin layer (5) may be a single composition of a polyolefin resin having a carboxyl group, for example, or a mixed composition of two or more kinds of substances different in the melting point.

(Outside Substrate Layer)

The outside substrate layer (2) containing a heat-resistant resin bears strength and good molding properties as a packaging material. In the invention, it is essential that the outside substrate layer (2) particularly contains a biaxially oriented polyethyleneterephthalate resin film and the tensile breaking strengths in the direction M and in the direction T and the balance thereof are set in a range satisfying the following Expressions (I) and (II).

$$500\ \text{MPa} \leq MB+TB \leq 700\ \text{MPa} \quad \text{Expression (I)}$$

$$|MB-TB| \leq 30\ \text{MPa} \quad \text{Expression (II)}$$

MB: Tensile breaking strength in the direction M of the biaxially oriented polyethyleneterephthalate film TB: Tensile breaking strength in the direction T of the biaxially oriented polyethyleneterephthalate film Particularly by the use of the biaxially oriented polyethyleneterephthalate resin as the heat-resistant resin, the outside substrate layer can be achieved which is excellent in chemical resistance, heat resistance, and the like while securing a required moldability as compared with a case of using another kind of heat-resistant resin, such as a polyamide resin or an acrylic resin.

By the use of the film satisfying Expressions (I) and (II) above as the biaxially oriented polyethyleneterephthalate resin, one excellent in the molding properties in secondary molding processing, such as draw forming and bulging, can be achieved. Therefore, in a case where the molding packaging material is molded into a tray shape, for example, even when the molding packaging material is molded into a container shape having a relatively sharp bent portion and a relatively high depth, i.e., one having a large capacity, molding defects, such as cracks and pinholes, are hardly generated.

Herein, when the value of MB+TB of Expression (I) is lower than 500 MPa, the strength as the outside substrate layer (2) which is required to bear the strength of a packaging material is insufficient. When the value exceeds 700 MPa, the strength exceeds a required limit to reach an excessive degree and is substantially meaningless and, on the contrary, a reduction in the molding properties may be caused and curling after molding may be noticeable, and thus the value is not preferable. The range of the MB+TB value is preferably 520 MPa to 650 MPa and particularly preferably 550 MPa to 600 MPa.

When the value of |MB−TB| exceeds 30 MPa and a difference in the strength in the direction M and the strength in the direction T is large, the result such that the moldability of the packaging material is impaired is caused also in this case. More specifically, molding defects, such as the generation of pinholes in a molded product after draw forming and/or bulging, and in a worse case, the generation of cracks, are likely to occur. When considering a respect of the difficulty in the film manufacturing, the |MB−TB| value is preferably in the range of generally 20 MPa or lower and particularly preferably 10 MPa or lower.

The thickness of the film constituting the outside substrate layer (2) is preferably set in the range of 10 to 50 μm. By setting the value to be equal to or higher than the suitable lower limit, sufficient strength as a packaging material can be secured. Furthermore, by setting the value to be equal to or lower than the suitable upper limit, stress in bulging and draw forming can be made small, so that the molding properties can be improved. A more preferable thickness range is about 12 to 20 μm.

A method for manufacturing the above-described film satisfying Expressions (I) and (II) is not particularly limited and is achieved by, for example, extruding a film from a die slit at a temperature of 270° C. to 320° C., cooling the film with a cooling roll, forming the film into a sheet shape, vertically drawing the film by twice to 4 times with a roll heated to 80° C. to 90° C., sequentially drawing the film by twice to 4 times in a horizontal direction at a temperature of 95° C. to 110° C., subsequently heat treating the film in a heat chamber of 150° C. to 250° C., and then cooling and winding up the film. In such a manufacturing process, when the tensile breaking strength in the direction M of the biaxially oriented polyethyleneterephthalate film is defined as "MB" and the tensile breaking strength in the direction T of the biaxially oriented polyethyleneterephthalate film is defined as "TB", it is controlled in such a manner that the film satisfies the following Expressions (I) and (II) by adjusting the draw ratio and the heat treatment temperature:

$$500\ \text{MPa} \leq MB+TB \leq 700\ \text{MPa} \qquad \text{Expression (I)}$$

$$|MB-TB| \leq 30\ \text{MPa} \qquad \text{Expression (II)}$$

(Outside Adhesive Layer)

An adhesive constituting the adhesive layer (11) includes, but not particularly limited thereto, a two component curing type urethane adhesive containing a polyol component and an isocyanate component and the like, for example. The two component curing type urethane adhesive is suitably used when bonding by a dry lamination method. The polyol component includes, but not particularly limited thereto, polyester polyol, polyether polyol, and the like, for example. The isocyanate component includes, but not particularly limited thereto, diisocyanates, such as TDI (tolylenediisocyanate), HDI (hexamethylenediisocyanate), and MDI (methylenebis(4,1-phenylene)diisocyanate), for example. The thickness of the adhesive layer (11) is preferably set to 2 μm to 5 μm and particularly preferably set to 3 μm to 4 μm.

(Barrier Layer—Metallic Foil—)

The metallic foil (4) forming the barrier layer has a function of giving gas barrier properties for preventing entering of oxygen or moisture into the molding packaging material (1). The metallic foil (4) includes, but not particularly limited thereto, aluminum foil, copper foil and the like, for example, and the aluminum foil is generally used. The thickness of the metallic foil is preferably 20 μm to 100 μm. Due to the fact that the thickness is 20 μm or more, the generation of pinholes in rolling when manufacturing the metallic foil can be prevented. Due to the fact that the thickness is 100 μm or lower, stress in bulging and draw forming can be made small, so that the molding properties can be improved.

In the metallic foil (4) as the barrier layer, at least to the inside surface (4*a*), i.e., the surface on the side of the sealant layer (3), is subjected to chemical conversion treatment. By subjecting such chemical conversion treatment to the metallic foil, a corrosion of the surface of the metallic foil caused by contents (an electrolytic solution of a battery, foods, pharmaceuticals, and the like) can be sufficiently prevented. For example, the metallic foil is subjected to the chemical conversion treatment by carrying out the following treatment. More specifically, for example, 1) an aqueous solution containing a mixture of metallic salts of phosphoric acid, chromic acid, and fluoride, 2) an aqueous solution containing a mixture of phosphoric acid, chromic acid, and fluoride metallic and nonmetallic salts, 3) an aqueous solution containing a mixture of an acrylic resin or/and a phenol resin, phosphoric acid, chromic acid, and a fluoride metallic salt, and 4) an aqueous solution containing a mixture of an acrylic resin or/and a phenol resin, an phosphate or a phosphoric acid compound, a chromate or a chromic acid compound, and a fluoride metallic salt, are applied to the surface of the metallic foil subjected to degreasing treatment, and then dried to thereby form a chemical conversion film.

(Inside Adhesion Resin Layer)

With respect to the inside adhesion resin layer (5) for bonding the barrier layer (4) and the inside sealant layer (3), the selection of the material is particularly important in order to prevent a degradation with time of the lamination strength caused by an influence of an electrolytic solution and the like. An adhesive resin having good adhesiveness at least to both the metallic foil (aluminum) (4) as the barrier layer and an interface resin of the inside sealant layer (3) is required to use. A specific resin type includes, but not particularly limited thereto, a resin obtained by performing graft addition modification or copolymerization of dicarboxylic acids, such as maleic acid, fumaric acid, itaconic acid, and mesaconic acid, dicarboxylic acid anhydrides, such as a maleic acid anhydride, fumaric acid anhydride, itaconic acid anhydride, and mesaconic acid anhydride, carboxyl group containing monomers, such as acrylic acid, methacrylic acid, crotonic acid, and itaconic acid, and the like, with polypropylene, for example. Among the above, a resin obtained by performing graft addition modification with maleic acid anhydride, acrylic acid, and methacrylic acid is preferably used, and particularly maleic anhydride modified polyolefin resin is preferable. A method for manufacturing the resin is not particularly limited and a solution method including dissolving polypropylene in an organic solvent, and then reacting the solution with acid (maleic acid anhydride and the like) in the presence of a radical generating agent, a melting method including heating and melting polypropylene, and then reacting the resultant substance with acid (maleic acid anhydride and the like) in the presence of a radical generating agent, and the like, can be mentioned, for example.

The inside adhesion resin layer (5) is particularly preferably constituted by an adhesive composition containing a polyolefin resin having a carboxyl group in the chemical structure and a multifunctional isocyanate compound in order to increase the useful life of the packaging material by sufficiently securing electrolytic solution resistance. The formation of the adhesion resin layer (5) is usually performed by applying an adhesive liquid containing a polyolefin resin having a carboxyl group, a multifunctional isocyanate compound, and an organic solvent to the metallic foil (4) as the barrier layer or/and the inside sealant layer (3), and then drying the same.

The polyolefin resin having a carboxyl group (hereinafter also sometimes referred to as a "carboxyl group containing polyolefin resin") includes, but not particularly limited thereto, a modified polyolefin resin obtained by performing graft polymerization of ethylenic unsaturated carboxylic acid or an acid anhydride thereof with polyolefin, a copolymerization resin of an olefin monomer and ethylenic unsaturated carboxylic acid, and the like, for example. The polyolefin includes, but not particularly limited thereto, homopolymers of olefin monomers, such as ethylene, propylene, and butene, or copolymers of these olefin monomers, and the like, for example. The ethylenic unsaturated carboxylic acid includes acrylic acid, methacrylic acid, maleic acid, fumaric acid, crotonic acid, itaconic acid, and the like, for example. The ethylenic unsaturated carboxylic acid may be used singly or in combination of two or more kinds thereof. As the carboxyl group containing polyolefin resin, one which dissolves in an organic solvent is preferably used.

Among the above, as the carboxyl group containing polyolefin resin, it is preferable to use a modified polyolefin resin obtained by performing graft polymerization of ethylenic unsaturated carboxylic acid or an acid anhydride thereof with a homopolymer of propylene or a copolymer of propylene and ethylene.

The multifunctional isocyanate compound reacts with the carboxyl group containing polyolefin resin, and acts as a curing agent for curing an adhesive composition. The multifunctional isocyanate compound includes, but not particularly limited thereto, toluene diisocyanate, diphenyl methane diisocyanate, hexamethylene diisocyanate, isophorone diisocyanate, isocyanurate modified substances, biuret modified substances of the diisocyanate compounds, or modified substances obtained by performing adduct modification of the diisocyanate compounds with polyhydric alcohols, such as trimethylol propane, and the like, for example. The multifunctional isocyanate compounds may be used singly or in combination of two or more kinds thereof. As the multifunctional isocyanate compound, a multifunctional isocyanate compound which dissolves in an organic solvent is preferably used.

The organic solvents are not particularly limited insofar as the organic solvents can dissolve or disperse the carboxyl group containing polyolefin resin. Among the above, organic solvents which can dissolve the carboxyl group containing polyolefin resin are preferably used. As the organic solvents, organic solvents which can be easily volatilized and removed from the adhesive liquid by heating or the like are preferably used. Mentioned as the organic solvents which can dissolve the carboxyl group containing polyolefin resin and can be volatilized and removed by heating or the like are, for example, aromatic organic solvents such as toluene and xylene, aliphatic organic solvents such as n-hexane, alicyclic organic solvents such as cyclohexane and methyl cyclohexane (MCH), ketone organic solvents such as methyl ethyl ketone (MEK), and the like. These organic solvents may be used singly or in combination of two or more kinds thereof.

In the adhesive liquid or the adhesion resin composition, the equivalent ratio [NCO]/[OH] of an isocyanate group of the multifunctional isocyanate compound to a hydroxyl group constituting the carboxyl group of the carboxyl group containing polyolefin resin is preferably set to 1.0 to 10.0. When the ratio is set in such a range, the adhesive composition excellent in the initial adhesion performance can be achieved and a reduction with time in the adhesion strength between the metallic foil layer (4) and the inside sealant layer (3) caused by an electrolytic solution of a battery can be sufficiently suppressed over a longer period of time, so that the electrolytic solution resistance can be further increased. The equivalent ratio [NCO]/[OH] is more preferably set to 1.5 to 9.0 and particularly preferably set to 1.5 to 6.0.

In the adhesive liquid and the adhesive composition, additives, such as a reaction accelerator, a tackifier, and a plasticizer, may be compounded, as required. Inorganic or organic antiblocking agents and amide slip agents may be added to the constituent resin described above insofar as the effects of the invention are not impaired.

The thickness of the adhesion resin layer (5) is preferably set to 1 μm to 15 μm. When the thickness is 1 μm or more, sufficient adhesive strength can be obtained. When the thickness is 15 μm or lower, the water vapor barrier properties can also be improved.

The carboxyl group containing polyolefin resin of the adhesion resin layer (5) may be a single composition or a mixture of two or more kinds of substances different in the melting point.

(Inside Sealant Layer)

The resin constituting the inside sealant layer (3) includes, but not particularly limited thereto, 1) a random copolymer resin containing propylene and ethylene as a copolymerization component,
2) a copolymer resin containing propylene, ethylene, and butene as a copolymerization component,
3) a block copolymer resin containing propylene and ethylene as a copolymerization component,
4) a propylene homopolymer, or a multilayer substance containing any one of 1) to 4) above, and the like for example.

In the copolymer resin of each of 1) to 4) above, an olefin thermoplastic elastomer may be blended.

For the resin of the inside sealant layer (3), it is preferable to use a copolymer resin having a melting point of 130° C. to 160° C. The copolymer resin having a melting point of 130° C. to 160° C. refers to a resin having a peak temperature (melting point) measured by a DSC (differential scanning calorimeter) at a temperature elevation rate of 20° C./min of 130° C. to 160° C. Due to the fact that the melting point is 130° C. or higher, sufficient heat resistance can be secured and also, due to the fact that the melting point is 160° C. or lower, excellent sealing properties can be secured.

Among the resin 1) to the resin 4) above constituting the inside sealant layer (3), it is preferable to use a copolymer resin containing at least propylene and ethylene as a copolymerization component and having an MFR of 1 g/10 min to 15 g/10 min. The MFR (melt flow rate) is a value measured according to JIS K7210-1999 (Condition M). Due to the fact that the MFR is 1 g/10 min or more, extrusion lamination can be easily performed. Due to the fact that the MFR is 15 g/10 min or lower, the fluidity of the resin in sealing becomes moderate, so that more excellent sealing properties can be secured.

The thickness of the inside sealant layer (3) is preferably 10 to 80 μm. Due to the fact that the thickness is 10 μm or more, sufficient sealing strength can be obtained, and also, due to the fact that the thickness is 80 μm or lower, a water vapor barrier from the end surface can be sufficiently prevented from being damaged. It is a matter of course that the inside sealant layer (3) may be constituted by a single layer as mentioned above, or a multilayer such as a co-extrusion film of polypropylene and one obtained by performing extrusion lamination of polypropylene two times. In the latter case, when a polypropylene layer with high fluidity is disposed on the outside (innermost layer side) of a polypropylene layer with low fluidity, an extremely reduction in the seal thickness due to an unusual flow of the polypropylene layer in sealing can be prevented.

In the molding packaging material (1) of the configuration described above, the adhesion resin layer (5) is excellent in affinity to both the metallic foil as the barrier layer (4) and the inside sealant layer (3), and therefore the interlayer lamination strength between the layers can be sufficiently increased. Therefore, when the packaging material (1) is molded into a battery case, for example, a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can also be prevented, so that sufficient sealing properties can be secured.

(Manufacturing Method)

Next, an example of a method for manufacturing the molding packaging material (1) of the invention is described with reference to FIGS. 1 and 2.

First, a biaxially oriented polyethyleneterephthalate film as the outside substrate layer (2) is bonded to one surface of the metallic foil (4) as the barrier layer with the adhesive (11) by a dry lamination method, for example.

As the metallic foil (4), a metallic foil in which at least the inside surface (surface to which a treatment liquid to be used in the following process is applied) (4*a*) is subjected to chemical conversion treatment is used. The metallic foil (4) in which both surfaces are subjected to chemical conversion treatment may be used.

On the other surface (inside surface) (4*a*) of the metallic foil (4), the inside sealant layer (3) is formed through the adhesion resin layer (5) having good adhesiveness to both the metallic foil and the interface side resin of the inside sealant layer.

Herein, the formation of the inside adhesion resin layer (5) and the inside sealant layer (3) can be performed by, for example, forming and preparing a film (20) of a multilayered configuration in which the adhesion resin layer (5) and the inside sealant layer (3) are laminated by a T die method or an inflation method beforehand, placing the film on the chemical conversion-treated surface of the metallic foil (4), and then passing the same through a heat roll (22) heated to 130° C. to 220° C. By passing the resultant substance in such a manner that the biaxially oriented polyethyleneterephthalate (2) side is the heat roll (22) side, thereby obtaining a laminate as the molding packaging material (1) (FIG. 2).

The material of the surface of the heat roll (22) is not particularly limited and general materials, such as stainless steel, can be used, for example.

The molding packaging material (1) of the invention is manufactured into a packaging container body for a battery case, foods, and pharmaceuticals, and the like by molding (bulging, deep draw forming, and the like) into various shapes, such as a rectangular parallelepiped shape with a high molding height. In the battery case, the food packaging container, or the pharmaceutical packaging container obtained by performing such molding, the contents are prevented from entering between the layers of the metallic foil (4) and the inside adhesion resin layer (5). Therefore, when molded into a battery case, for example, a reduction in the lamination strength caused by an influence of an electrolytic solution can be prevented and a reduction in the lamination strength caused by an influence of a generation of heat and an expansion and a contraction of the packaging material due to a repetition of charge and discharge can be prevented, so that sufficient sealing performance can be maintained over a long period of time.

EXAMPLES

Next, specific Examples of the invention are described but the invention is not particularly limited to those Examples.

Example 1

A chemical conversion treatment liquid containing polyacrylic acid, a trivalent chromium compound, water, and alcohol was applied to both surfaces of a 40 μm thick aluminum foil (substrate layer) (4), the aluminum foil was dried at 180° C., and then chemical conversion treatment was carried out in such a manner that the chromium adhesion amount was 10 mg/m$^2$.

Then, a 12 μm thick biaxially oriented polyethyleneterephthalate film (outside substrate layer) (2) was dry laminated on one surface of the aluminum foil (4) with a two component curing type urethane adhesive (outside substrate layer).

Furthermore, a maleic acid modified polypropylene resin (5) (inside adhesive layer) having adhesiveness to both metallic foil and polypropylene and an ethylene-propylene random copolymer resin having a melting point of 140° C. and an MFR of 7 g/10 min were extruded and prepared as a laminate film (20) on the other surface of the aluminum foil by a T die method in such a manner that the maleic acid modified polypropylene resin layer (5) was 7 μm and the ethylene-propylene random copolymer layer (3) was 28 μm.

Figure 2:
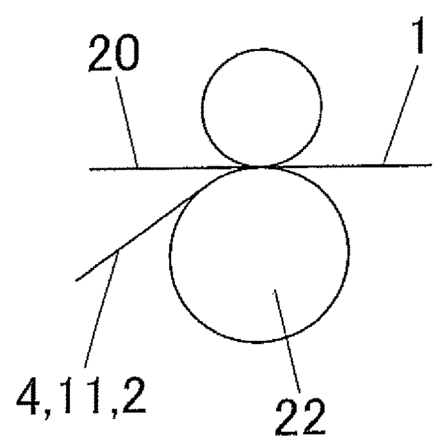
FIG. 2 is a schematic explanatory view illustrating a method for manufacturing a molding packaging material according to the present invention.

Subsequently, the laminate film (20) was placed on the chemical conversion-treated surface (4*a*) of the aluminum foil (4), and then passed through a heat roll (22) heated to 150° C. as illustrated in FIG. 2, thereby obtaining a molding packaging material (1). In this process, heat treatment was performed in a state where the biaxially oriented polyethyleneterephthalate film side was disposed on the side of the heat roll heated to 150° C.

The biaxially oriented polyethyleneterephthalate film used herein was one satisfying $$MB+TB=560\text{ MPa}$$

$$|MB-TB|\leq 25\text{ MPa}$$

when the tensile breaking strength in the direction M of the biaxially oriented polyethyleneterephthalate film was defined as "MB", and the tensile breaking strength in the direction T of the biaxially oriented polyethyleneterephthalate film was defined as "TB".

The materials, the compositions, the physical properties, the components, and the like of the outside substrate layer, the inside adhesive layer, and the sealant layer are as shown in Table 1.

In Table 1, the following abbreviated names are used.

Oriented PET: Biaxially oriented polyethyleneterephthalate film

Oriented Ny: Biaxially oriented polyamide (6 nylon) film m-PP: Maleic acid anhydride modified polypropylene (Modified polypropylene resin obtained by performing graft polymerization of maleic acid anhydride with a copolymer of propylene and ethylene)

M-PP: Maleic acid anhydride modified polypropylene (Modified polypropylene resin obtained by performing graft polymerization of maleic acid anhydride with a copolymer of propylene and ethylene)

Random PP: Propylene-ethylene random copolymer resin

Block PP: Propylene-ethylene block copolymer resin

PP: Polypropylene resin

Multifunctional isocyanate: Polymer body of hexamethylene diisocyanate (NCO content of 23.1 mass %)

Polyolefin polyol adhesive: Adhesive containing polyolefin polyol (Number average molecular weight of 2000 and Hydroxyl group value: 50 mgOH/g) and multifunctional isocyanate (manufactured by Nippon Polyurethane Industry Co., Ltd., Product name "Coronate HX") as an essential ingredient, toluene/methyl ethyl ketone:80/20 as a solvent, a thermoplastic elastomer (manufactured by Kraton Polymers Inc, Product name "Kraton G-1657"), and an adhesion imparting agent (manufactured by Arakawa Chemical Industries, Ltd., Product name "Arkon P-90").

Examples 2 to 4

Molding packaging materials were obtained in the same manner as in Example 1, except using those having MB+TB values of 510, 600, and 630 and |MB−TB| values of 10, 5, and 2 as the biaxially oriented polyethyleneterephthalate resin film of the outside substrate layer.

Example 5

A molding packaging material was obtained in the same manner as in Example 1, except using a maleic acid modified polypropylene resin having a melting point of 160° C. and an MFR of 7 g/10 min as the inside sealant layer (3) and setting the temperature of the heat roll to 170° C.

Example 6

A molding packaging material 1 was obtained in the same manner as in Example 1, except using a propylene-ethylene copolymer resin having a melting point of 130° C. and an MFR of 21 g/10 min as the inside sealant layer and setting the thickness of the adhesion resin layer to 10 μm and setting the thickness of the sealant layer to 70 μm.

Example 7

A 12 μm thick biaxially oriented polyethyleneterephthalate film 2 was dry laminated on one surface of an aluminum foil (barrier layer) in which both surfaces were subjected to chemical conversion treatment in the same manner as in Example 1 with a two component curing type urethane adhesive.

Subsequently, a 40 μm thick propylene-ethylene random copolymer film (Melting point measured by DSC of 140° C.) was laminated and integrated on the other surface of the aluminum foil by a sandwich lamination method through a 5 μm thick adhesive resin and an extruded polypropylene resin obtained by extruding an ethylene-propylene random copolymer resin layer having a melting point of 130° C. with a thickness of 15 μm extruded from an extrusion die of an extrusion machine, and then the laminate was passed through a heat roll heated to 150° C., thereby obtaining a molding packaging material. In this process, the laminate was passed through the heat roll while facing the biaxially oriented polyethyleneterephthalate film side to the heat roll side. The used biaxially oriented polyethyleneterephthalate film was the same one as that of Example 1.

Example 8

A 12 μm thick biaxially oriented polyethyleneterephthalate film (outside substrate layer) was dry laminated on one surface of an aluminum foil (barrier layer) in which both surfaces were subjected to chemical conversion treatment in the same manner as in Example 1 with a two component curing type urethane adhesive.

Subsequently, an adhesive in which 0.9 g of a polymer body of hexamethylene diisocyanate (multifunctional isocyanate compound, NCO content of 23.1 mass %) was mixed in a solution in which 15 g of maleic acid modified polypropylene (modified polypropylene resin obtained by performing graft polymerization of maleic anhydride with a copolymer of propylene and ethylene, Melting temperature: 77° C., Acid value: 10 mgKOH/g) was dissolved in 85 g of a mixed solvent (mixed solvent of methyl cyclohexane: methyl ethyl ketone=8 parts by mass:2 parts by mass) in such a manner that the equivalent ratio [NCO]/[OH] was 1.8 was applied onto the other surface of the aluminum foil, and then dried at 80° C. to form a 3 μm thick inside adhesion resin layer. Then, a 80 μm thick propylene-ethylene random copolymer film (inside sealant layer) was dry laminated on the surface of the dried adhesion resin layer. A molding packaging material was obtained in the same manner as in Example 1, except the operation above.

Example 9

To a chemical conversion-treated surface of an aluminum foil in which both surfaces were subjected to chemical conversion treatment, an adhesive containing polyolefin polyol (Number average molecular weight of 2000 and Hydroxyl group value: 50 mgOH/g) and multifunctional isocyanate (manufactured by Nippon Polyurethane Industry Co., Ltd., Product name "Coronate HX") as an essential ingredient, toluene/methyl ethyl ketone:80/20 as a solvent, a thermoplastic elastomer (manufactured by Kraton Polymers Inc, Product name "Kraton G-1657"), and an adhesion imparting agent (manufactured by Arakawa Chemical Industries, Ltd., Product name "Arkon P-90") was applied and dried to form a 3 μm thick adhesion resin layer.

Then, an 80 μm thick non-oriented film (3) of three layers containing a propylene-ethylene random copolymer, block polypropylene, and a propylene-ethylene random copolymer (inside sealant layer) shown in Table 1 was dry laminated on the dried adhesion resin layer surface. A molding packaging material was obtained in the same manner as in Example 1, except the operation above.

Comparative Examples 1 and 2

Molding packaging materials were obtained in the same manner as in Example 8, except using those having MB+TB values of 430 and 730 and |MB−TB| values of 55 and 40 as the biaxially oriented polyethyleneterephthalate resin film of the outside substrate layer.

Comparative Example 3

A molding packaging material was obtained in the same manner as in Example 8, except using a 15 μm thick biaxially oriented 6 nylon film (MB+TB=470 MPa, |MB−TB|=60 MPa) as the heat-resistant resin of the outside substrate layer.

The melting point mentioned in the description of each Example and each Comparative Example above is a melting point measured at a temperature elevation rate of 20° C./min using an automatic differential scanning calorimeter manufactured by Shimadzu Corp. (Product number: DSC-60A).

The tensile breaking strength is a value measured using a TENSILON RTA-100 manufactured by Orientec Co., Ltd. at a tensile speed of 100 mm/min, a test sample width of 15 mm, and a distance between chucks of 50 mm.

Each molding packaging material obtained as described above was evaluated for the performance based on the following evaluation methods. The results are shown in Table 1.

TABLE 1

| | Examples | | | | | | | | | Comparative Examples | | |
|---|---|---|---|---|---|---|---|---|---|---|---|---|
| Classification | 1 | 2 | 3 | 4 | 5 | 6 | 7 | 8 | 9 | 1 | 2 | 3 |
| Outside substance layer | | | | | | | | | | | | |
| Type | Oriented PET | ← | ← | ← | ← | ← | ← | ← | ← | ← | ← | Oriented Ny |
| MB + TB (MPa) | 560 | 510 | 600 | 630 | 560 | ← | ← | ← | ← | 430 | 730 | 470 |
| IMB − TBI (MPa) | 25 | 10 | 5 | 2 | 25 | ← | ← | ← | ← | 55 | 40 | 60 |
| Thickness (μm) | 12 | ← | ← | ← | ← | ← | ← | ← | ← | 12 | ← | 15 |
| Inside adhesion resin layer | | | | | | | | | | | | |
| Type | m-PP | ← | ← | ← | ← | ← | ← | M-PP + Multifunctional isocyanate | Polyolefin polyol adhesive | M-PP + Multifunctional isocyanate | ← | ← |
| Equivalent ratio [NCO]/[OH] | | | | | | | | 1.8 | | 1.8 | ← | ← |
| Melting point (° C.) | 140 | ← | ← | ← | 160 | 140 | 160 | 77 | | 77 | ← | ← |
| MFR (g/10 min) | 7 | ← | ← | ← | ← | 7 | 8 | | | | | |
| Viscosity of adhesive (MPa · S (25° C.)) | | | | | | | | 25 | | 25 | ← | ← |
| Thickness (μm) | 7 | ← | ← | ← | ← | 10 | 5 | 3 | ← | ← | ← | ← |
| Extruded resin layer | | | | | | | | | | | | |
| Type | | | | | | | Random PP | | | | | |
| Melting point (° C.) | | | | | | | 130 | | | | | |
| MFR (g/10 min) | | | | | | | 20 | | | | | |
| Thickness (μm) | | | | | | | 15 | | | | | |
| Sealant layer | | | | | | | | | | | | |
| Type | Random PP | ← | ← | ← | M-PP | Random PP | Random PP | ← | Random PP<br>Block PP<br>Random PP | Random PP | ← | ← |
| Melting point (° C.) | 140 | ← | ← | ← | 160 | 130 | 140 | 140 | 140<br>160<br>140 | 140 | ← | ← |
| MFR (g/10 min) | 7 | ← | ← | ← | 7 | 21 | 8 | 8 | 7<br>2<br>7 | 8 | ← | ← |
| Thickness (μm) | 28 | ← | ← | ← | ← | 70 | 40 | 40 | 12<br>56<br>12 | 80 | ← | ← |
| Performance evaluation | | | | | | | | | | | | |
| Molding properties | ◎ | ◎ | ◎ | ◎ | ◎ | ◎ | ◎ | ◎ | ◎ | x | x | x |
| Electrolytic solution adhesion appearance | ◎ | ◎ | ◎ | ◎ | ◎ | ◎ | ◎ | ◎ | ◎ | ◎ | ◎ | Δ |
| Lamination strength | ◎ | ◎ | ◎ | ◎ | ◎ | ◎ | ◎ | ○ | ○ | ○ | ○ | ○ |
| Electrolytic solution resistance | ◎ | ◎ | ◎ | ◎ | ◎ | ◎ | ◎ | ◎ | ○ | ◎ | ◎ | ◎ |
| Sealing performance | ◎ | ◎ | ◎ | ◎ | ○ | ◎ | ◎ | ◎ | ◎ | ◎ | ◎ | ◎ |

<Molding Properties Evaluation Method>

The molding packaging materials were subjected to bulging into a rectangular parallelepiped shape of Length of 55 mm×Width of 35 mm×Depth of 8 mm using a bulging machine manufactured by Amada Co., Ltd. (Product number: TP-25C-X2), and the molding properties were evaluated based on the following judgment criteria.

(Judgment Criteria)

"⊚" Pinholes were not generated and also cracks were not generated.

"Δ" Pinholes were slightly generated in a small portion but substantially hardly generated.

"x" Pinholes and cracks were generated in corner portions.

<Lamination Strength Evaluation Method>

The molding packaging materials were cut into a 15 mm width to form measurement pieces, and the lamination strength (lamination strength of the inside adhesion resin layer and the inside sealant layer) of the measurement pieces was measured by a tensile test machine under a 80° C. atmosphere.

(Judgment Criteria)

"⊚" The lamination strength is 5 N/15 mm width or more.

"○" The lamination strength is 3 N/15 mm width or more and lower than 5 N/15 mm width.

"x" The lamination strength is lower than 3 N/15 mm width.

<Electrolytic Solution Resistance Evaluation Method>

The molding packaging materials were cut into a 15 mm width to form measurement pieces, a solution in which lithium hexafluorophoshate was dissolved in a mixed solvent in which ethylene carbonate and diethylene carbonate were mixed with a capacity ratio of 1:1 in such a manner that the concentration was 1 mol/L and the measurement pieces were placed in a wide-mouth bottle formed with polytetrafluoroethylene, ethylene resin, the bottle was stored in a 85° C. oven for one week, the measurement pieces were taken out, and then the inside adhesion resin layer and the inside sealant layer were separated at the interface to measure the lamination strength (adhesion strength) between the layers.

(Judgment Criteria)

"⊚" With respect to the measured adhesion strength, the retention rate is 90% or more based on the initial adhesion strength.

"○" With respect to the measured adhesion strength, the retention rate is 60% or more and lower than 90% based on the initial adhesion strength.

"Δ" With respect to the measured adhesion strength, the retention rate is 30% or more and lower than 60% based on the initial adhesion strength.

"x" With respect to the measured adhesion strength, the retention rate is lower than 30% based on the initial adhesion strength (including one in which interlayer separation occurred during immersion).

<Electrolytic Solution Adhesion Appearance Evaluation>

The molding packaging materials were cut into 10 cm×10 cm, 1 cc of a solution in which lithium hexafluorophosphate was dissolved in a mixed solvent in which ethylene carbonate and diethylene carbonate were mixed with a capacity ratio of 1:1 in such a manner that the concentration was 1 mol/L was added dropwise to the outermost surface of the molding packaging materials, and then the appearance was evaluated when the surface of a portion to which the liquid droplets adhere was rubbed back and forth 10 times using a rubbing implement in which cotton was wound around a weight with a diameter of 1 cm and a weight of 1 Kg with the wound cotton.

"⊚" The appearance did not change even when the portion was rubbed back and forth 10 times.

"Δ" The appearance changed when the portion was rubbed back and forth 5 times.

"x" The appearance change when the portion was rubbed back and forth once.

<Sealing Performance Evaluation Method>

A seal separation test was carried out under the conditions of 25° C. and 80° C. using TENSILON RTA-100 manufactured by Orientec Co., Ltd., and a constant temperature bath TCF-III1-B manufactured by Baldwin, Inc., and then the sealing performance was evaluated. With respect to the sealing conditions, the sealing was performed for each molding packaging material at a sealing width of 5 mm, a sealing pressure of 0.3 MPa, a sealing time of 1 second, and a sealing temperature of 160° C. and 180° C. (both surface heating).

(Sealing Performance Judgment Criteria)

"⊚" Those having a strength of 30 N/15 mm or more in both a case where the sealing was carried out at 160° C. and the seal separation test was carried out at 25° C. and a case where the sealing was carried out at 180° C. and the seal separation test was carried out at 80° C.

"○" Those having a strength of 25 N/15 mm or more and lower than 30 N/15 mm was obtained in both a case where the sealing was carried out at 160° C. and the seal separation test was carried out at 25° C. and a case where the sealing was carried out at 180° C. and the seal separation test was carried out at 80° C.

"x" Those not falling under the criteria above (poor sealing performance).

As is clear from the performance evaluation results of Table 1, it was able to be confirmed in the molding test that, in the molding packaging materials of Examples 1 to 9 of the invention, pinholes and cracks are not generated and the molding properties are excellent. It was able to be confirmed that the packaging materials originally have sufficient interlayer lamination strength and are excellent also in electrolytic solution resistance, electrolytic solution adhesion appearance, and sealing performance.

On the other hand, when the biaxially oriented polyethyleneterephthalate films of Comparative Examples 1 and 2 in which the tensile breaking strengths in the direction MD and the direction TD and the balance thereof deviate from the stipulated range of the invention were used and when the biaxially oriented 6 nylon film was used for the outside substrate layer of Comparative Example 3, the molding packaging materials have inferior molding properties and are inferior also in electrolytic solution resistance and electrolytic solution adhesion appearance performance.

The present application claims priority of Japanese Unexamined Patent Application Publication No. 2011-72538, filed on Mar. 29, 2011 and the entire disclosure is a part of the present application.

INDUSTRIAL APPLICABILITY

The molding packaging material according to the invention is suitably used as a case material of batteries, such as lithium ion polymer secondary batteries for notebook personal computers, cellular phones, and on-vehicle and fixed type power sources, and also is suitably used as a packaging material for foods, pharmaceuticals, and the like.

REFERENCE SIGNS LIST

1 Molding packaging material

2 Outside substrate layer (heat-resistant resin layer)

3 Inside sealant layer (thermoplastic resin layer)

4 Metallic foil (barrier layer)
5 Inside adhesion resin layer
11 Adhesive layer
22 Heat roll

The invention claimed is:

1. A molding packaging material, comprising:

an outside substrate layer containing a heat-resistant resin;

an inside sealant layer containing a thermoplastic resin; and a metallic foil as a barrier layer provided between the outside substrate layer and the inside sealant layer; wherein at least an inside surface of the metallic foil layer is subjected to chemical conversion treatment, an inside adhesion resin layer is laminated on the chemical conversion-treated surface, and the inside sealant layer is further laminated through the adhesion resin layer, the outside substrate layer contains a biaxially oriented polyethylene terephthalate film, and the biaxially oriented polyethylene terephthalate film satisfies the following Expressions (I) and (II), $$500\ \text{MPa} \leq MB+TB \leq 700\ \text{MPa} \quad \text{Expression (I)}$$

$$|MB-TB| \leq 30\ \text{MPa} \quad \text{Expression (II)}$$

the MB is a tensile breaking strength in a direction M of the biaxially oriented polyethylene terephthalate film and the TB is a tensile breaking strength in a direction T of the biaxially oriented polyethylene terephthalate film;

the inside adhesion resin layer contains an adhesive containing a multifunctional isocyanate compound and a polyolefin resin having a carboxyl group, which is a modified polyolefin resin of graft polymerized ethylenic unsaturated carboxylic acid or an acid anhydride thereof with polyolefin, or a copolymerization resin of an olefin monomer and ethylenic unsaturated carboxylic acid, such that the inside adhesion resin layer has adhesiveness to both the metallic foil and the thermoplastic resin of the inside sealant layer;

the inside sealant layer contains a propylene homopolymer or a copolymer containing at least propylene and ethylene as a copolymerization component; and the inside sealant layer is a polymer or a copolymer having a melting point of 130° C. to 160° C. and an MFR of 1 to 25 g/10 min.

2. The molding packaging material according to claim 1, wherein an equivalent ratio [NCO]/[OH] of an isocyanate group of the multifunctional isocyanate compound to a hydroxyl group constituting the carboxyl group of the polyolefin resin is 1.0 to 10.0.

3. The molding packaging material according to claim 1, wherein, in the polyolefin resin having a carboxyl group, a melt flow rate (MFR) measured at 130° C. is 5 to 40 g/10 min.

4. A method for manufacturing a molding packaging material, comprising:

a step of subjecting at least one surface of a metallic foil barrier layer to a chemical conversion treatment;

a step of bonding a biaxially oriented polyethylene terephthalate film to another surface of the metallic foil barrier layer with an outside adhesive to form an outside substrate layer;

a step of forming an inside adhesion resin layer on the chemical conversion-treated surface of the metallic foil barrier layer;

a step of laminating and forming an inside sealant layer containing a thermoplastic resin on the inside adhesion resin layer; and a step of heat treating a laminate obtained by the steps above with a heat roll heated to 130° C. to 220° C. in such a manner that the outside substrate layer is on a side of the heat roll; wherein the biaxially oriented polyethylene terephthalate film satisfies the following Expressions (I) and (II), $$500\ \text{MPa} \leq MB+TB \leq 700\ \text{MPa} \quad \text{Expression (I)}$$

$$|MB-TB| \leq 30\ \text{MPa} \quad \text{Expression (II)}$$

the MB is a tensile breaking strength in a direction M of the biaxially oriented polyethylene terephthalate film and the TB is a tensile breaking strength in a direction T of the biaxially oriented polyethylene terephthalate film;

the inside adhesion resin layer contains an adhesive containing a multifunctional isocyanate compound and a polyolefin resin having a carboxyl group, which is a modified polyolefin resin of graft polymerized ethylenic unsaturated carboxylic acid or an acid anhydride thereof with polyolefin, or a copolymerization resin of an olefin monomer and ethylenic unsaturated carboxylic acid, such that the inside adhesion resin layer has adhesiveness to both the metallic foil barrier layer and the thermoplastic resin of the inside sealant layer;

the inside sealant layer contains a propylene homopolymer or a copolymer containing at least propylene and ethylene as a copolymerization component; and the inside sealant layer is a polymer or a copolymer having a melting point of 130° C. to 160° C. and an MFR of 1 to 25 g/10 min.

5. The method for manufacturing a molding packaging material according to claim 4, wherein an equivalent ratio [NCO]/[OH] of an isocyanate group of the multifunctional isocyanate compound to a hydroxyl group constituting the carboxyl group of the polyolefin resin of 1.0 to 10.0.

* * * * *